3,321,806
EXTRUDERS FOR INJECTION MOULDING MACHINES
Brian Harry Beebee, Walsall, England, assignor to Dunlop Rubber Company Limited, a British company
Filed Aug. 25, 1964, Ser. No. 391,915
Claims priority, application Great Britain, Sept. 14, 1963, 36,259/63
8 Claims. (Cl. 18—30)

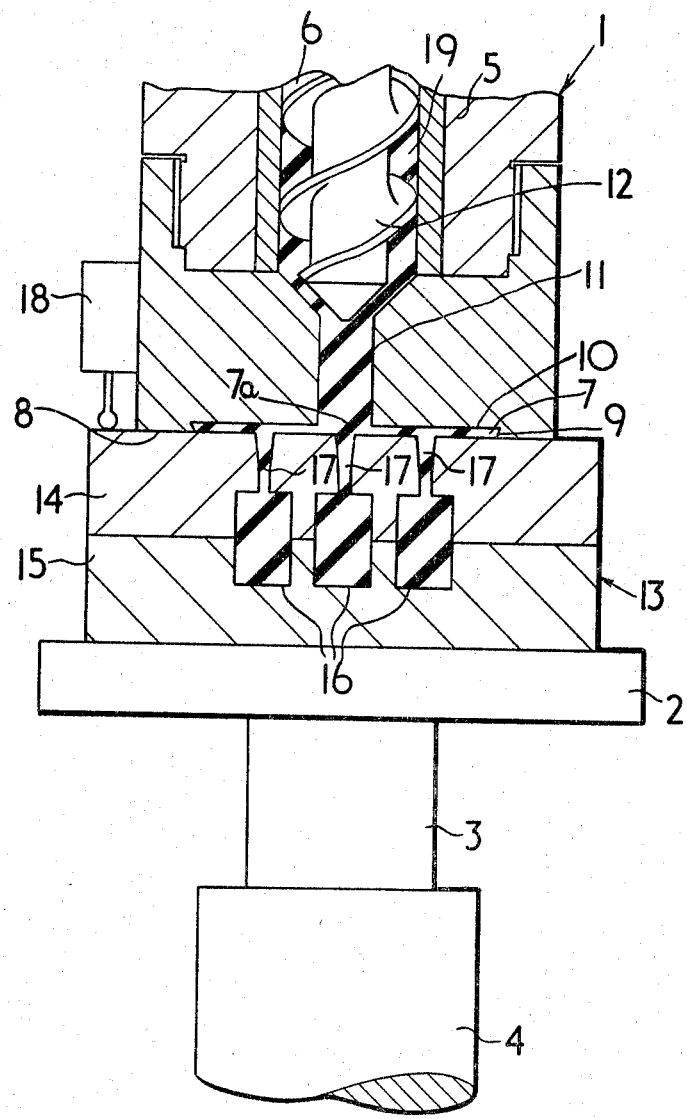

This invention relates to extruders for injection moulding machines.

According to the invention, an extruder for an injection moulding machine is formed with a chamber for containing rubber or other plastic material to be injected into a mould, a recess on its outer peripheral surface, and an outlet passageway for rubber or other plastic material, connecting the chamber with the recess.

Preferably, either the recess has sides which are at least partly defined by a frusto-conical surface of the extruder which tapers inwardly as it extends towards the outlet of the recess at the outer peripheral surface of the extruder, or the extruder is provided with a roughened surface which forms a base of the recess, said surface being roughened to assist in retaining rubber or other plastic material within the recess after an injection operation. However, both the frusto-conical surface and the roughened surface may be provided upon the extruder.

The invention also includes an injection moulding machine comprising an extruder as defined above.

The invention further includes an article moulded with the use of the extruder or injection machine defined in the preceding paragraphs.

One embodiment of the invention will now be described, by way of example, with reference to the accompanying drawing which is a view of an extruder cross-sectioned along the axis thereof, showing the extruder in engagement with a mould during an injection operation.

An injection moulding machine for use in the manufacture of rubber articles is provided with an extruder 1 carried in a support framework (not shown) vertically above a horizontally-disposed platen 2 for supporting, upon the machine, moulds to be filled with rubber. The platen 2 is carried upon the end of a piston rod 3 of a fluid-pressure-operated piston and cylinder assembly 4 for vertical movement of the platen towards or away from the extruder as will be described.

The extruder 1 comprises a cylindrical casing 5 surrounding a vertically-disposed cylindrical chamber 6, for containing an unvulcanised rubber compound, and an annular recess 7 formed, coaxially with the chamber, in a lower outer peripheral surface 8 of the cylindrical casing. The recess is defined partly by a frusto-conical surface 9 of the extruder, said surface tapering inwardly of the recess towards the longitudinal axis 7a of the recess from a base 10 thereof to the lower surface 8 of the extruder for a purpose to be described. An outlet passageway 11 for rubber extends coaxially downwardly through the casing from the chamber 6 and opens out into the recess, connecting the chamber with the recess. An extruder screw 12, operated by an electric motor (not shown) is rotatably and coaxially mounted within the chamber 6 with the lower end of the screw located adjacent the upper end of the passageway.

A limit switch 18 secured to the side of the extruder, is operable by a mould, as will be described, to energise the electric motor to operate the extruder screw.

A split mould 13 for use with the machine comprises a top mould half 14 and a bottom mould half 15, and the mould halves, in assembled relationship, define three cylindrical mould cavities 16 shaped complementarily with respect to the articles to be moulded and vulcanised in them. The total effective cross-sectional area of the mould cavities, that is the area upon which rubber will act after filling of the mould, tending to separate the mould halves, is less than the area of the recess 7 in the plane of the lower surface 8 of the extruder. The top mould half 14 is provided with three separate inlet holes 17, one to each of the mould cavities. The top mould half is provided with a plurality of dowels (not shown) for sliding reception during assembly of the mould halves, within complementarily shaped holes (not shown) provided in the bottom mould half to ensure correct location of the top mould half upon the bottom mould half. The mould is, however, devoid of means for clamping the halves together.

In use of the machine, the chamber within the extruder is initially filled with unvulcanised rubber 19.

With the extruder 1 and platen 2 located at their furthest positions apart, the empty mould 13, in its assembled condition, is located upon the platen. The platen is then raised, by the piston rod 3 of the vertical piston and cylinder assembly 4, to raise the mould to bring its upper surface into engagement with the lower surface 8 of the extruder. At the end of its upward stroke as shown in the drawing, the mould operates the limit switch 18 to energise the electric motor to operate the extruder screw 12, resulting in extrusion of rubber from the extruder through the passageway 11 and into the recess 7, and injection of the rubber through the inlet holes 17 of the mould into the mould cavities 16. During this operation, the recess 7 becomes filled with rubber and, as the area of the recess in the plane of the lower surface of the extruder is greater than the effective cross-sectional area of the mould cavities, the load imposed upon the mould by the rubber in the recess to maintain the mould closed is always greater than the load imposed by the rubber within the cavities and tending to separate the mould halves, so that the mould is maintained in a completely closed condition even when the mould cavities are completely filled with rubber.

When the mould cavities are filled, the pressure of the rubber being forced out of the extruder overcomes the upward force of the piston rod 3, so that the mould is moved downwards and out of engagement with the extruder. Immediately this occurs, the limit switch 18 is operated by the mould to de-energise the electric motor to stop the operation of the extruder.

The filled mould is then removed from the machine and placed under pressure in a curing oven to vulcanise the moulded articles.

After removal of the mould from the extruder and before a succeeding injection operation is performed on a succeeding empty mould, the unvulcanised rubber filling the recess 7 of the extruder remains within the recess, the frusto-conically shaped surface 9 assisting in retaining the rubber in position.

As may be seen from the above description, where an extruder according to the invention is used to fill a mould the effective cross-sectional area of which is less than that of the area of the recess in the plane of the lower surface of the extruder, no means, other than the force applied by rubber contained within the recess are required to hold the mould in a closed condition. In consequence, one movement only, that of moving the mould upon the platen into engagement with the extruder, is required to clamp the mould halves together, and fill the mould. In addition, in a case where a multi-cavity mould is used with an extruder according to the invention, a plurality of inlet holes can be used in the mould, one or more holes leading to each cavity, the inlet holes being spaced-apart at the outer surface of the mould but still being connectable with the extruder chamber since they are spanned by the extruder recess. This construction overcomes a difficulty in the manufacture of moulds for use with conventional extruders in injection machines, in which, because of the narrowness of the outlet nozzle of the conventional extruder, one inlet hole only may be provided in a multi-cavity mould, the cavities being connected to the inlet hole by a system of galleries.

It follows, therefore, from the statements in the preceding paragraph, that moulds for use with an extruder according to the invention may be produced less expensively than moulds made for use with conventional extruders. Also by eliminating the use of galleries, less wastage of rubber results and cleaning the inlet passages of the mould after removal of a vulcanised article is less difficult and time consuming.

Further, as the extruder according to the invention is provided with a recess instead of the narrow outlet to a passageway as is provided in the nozzles of conventional extruders used with injection machines, a mould need not be so accurately located against the extruder to ensure that the mould cavity is connected with the extruder chamber as is the case with conventional extruders. An injection machine incorporating an extruder according to the invention is, therefore, cheaper to manufacture than previously known machines.

Also, in the use of the extruder according to the invention, the rubber which is contained within the recess is not wasted after an injection operation, as this rubber is not vulcanised as it would be if contained within a recess provided within the top mould half, but may be used for filling a succeeding empty mould during a succeeding injection operation.

A further advantage concerns articles moulded when the mould halves are held in a closed condition as decribed above. Due to the fact that the mould remains fully closed during mould filling, there is less wastage caused by rubber flowing between the mould halves than upon an injection machine where the mould is not so efficiently held closed, and a more perfectly moulded article is thereby obtained. Also, less trimming of moulding spew is needed.

Having now described my invention what I claim is:

1. Injection moulding apparatus for rubber or other plastic material comprising an injector and a mould having at least one moulding cavity therein and being operably engageable with the injector, an end surface on the injector having a feed recess formed therein, an end surface on the mould having a plurality of inlet holes connected to said moulding cavity or cavities and said two end surfaces being engageable so that said feed recess of the injector spans the said plurality of inlet holes of the mould.

2. An injection moulding apparatus according to claim 1 provided with a frusto-conical surface which partly defines the recess, said frusto-conical surface tapering inwardly towards the longitudinal axis of the recess as it extends towards the outlet thereof at the outer peripheral surface of the extruder.

3. An injection moulding apparatus according to claim 2 provided with a roughened surface located adjacent the end of the frusto-conical surface which is remote from the outer peripheral surface of the extruder, said roughened surface forming a base of the recess and being roughened to assist in retaining plastic material within the recess after an injection operation.

4. Injection moulding apparatus as claimed in claim 1 wherein the area projected by said moulding cavity or cavities on said end surface of the mould is less than the area of said recess in the injector.

5. An injection moulding apparatus which comprises a pair of mould parts having complementary mould recesses matching to form mould cavities when said mould parts are assembled with complementary surfaces in contact and having inlet holes in one of said mould parts from said recesses to an outer surface of said mould part and an extruder having a surface to engage said outer surface of said mould part and having a recess over an area greater than the total cross-section of said mould cavities taken in the plane of said complementary surfaces to provide a force holding said mould parts together greater than the reactive force of pressurized plastic acting in a direction to separate said mould parts.

6. The injection moulding apparatus of claim 5 comprising a means for pressing said assembled mould parts into pressurized contact with said extruder and means to stop the action of said extruder when the reactive force of pressurized plastic in said apparatus separates said assembly of mould parts from said extruder.

7. The injection moulding apparatus of claim 6 in which said means to stop the action of said extruder comprises a limit switch on said extruder and having a movable element engaged by said mould part assembly.

8. The injection moulding apparatus of claim 5 in which the cross-section of said recess in said extruder increases in a direction away from said surface of said extruder.

References Cited

UNITED STATES PATENTS 3,012,280 12/1961 Scott et al. ............ 18—30
3,159,878 12/1964 Scott et al. ............ 18—30

J. SPENCER OVERHOLSER, *Primary Examiner.*

W. L. McBAY, *Assistant Examiner.*